(12) United States Patent
Matscheko et al.

(10) Patent No.: US 9,130,444 B2
(45) Date of Patent: Sep. 8, 2015

(54) ROTARY DRIVE WITH STRAIGHT PRIMARY PART SEGMENTS

(75) Inventors: Gerhard Matscheko, Starnberg (DE); Johannes Wollenberg, Gräfelfing (DE); Wolfgang Wolter, Herbertshausen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 840 days.

(21) Appl. No.: 12/523,600

(22) PCT Filed: Jan. 15, 2008

(86) PCT No.: PCT/EP2008/050373
§ 371 (c)(1),
(2), (4) Date: Jul. 17, 2009

(87) PCT Pub. No.: WO2008/087130
PCT Pub. Date: Jul. 24, 2008

(65) Prior Publication Data
US 2010/0083851 A1    Apr. 8, 2010

(30) Foreign Application Priority Data
Jan. 18, 2007 (DE) .......................... 10 2007 002 782

(51) Int. Cl.
*H02K 41/02* (2006.01)
*H02K 41/03* (2006.01)
(Continued)

(52) U.S. Cl.
CPC .............. *H02K 41/031* (2013.01); *H02K 16/00* (2013.01); *H02K 1/278* (2013.01); *H02K 21/24* (2013.01); *H02K 2201/15* (2013.01)

(58) Field of Classification Search
CPC ... H02K 37/00; H02K 21/24; H02K 2201/12; H02K 2201/15; H02K 1/27; H02K 21/14; H02K 41/03; H02K 1/278; H02K 41/02; H02K 41/06; H02K 41/025; H02K 41/031
USPC .............. 310/156.32, 266, 268, 49.22–49.28, 310/154.01, 154.06, 154.11, 216.008, 112, 310/114, 12.09, 12.29, 12.15
See application file for complete search history.

(56) References Cited

U.S. PATENT DOCUMENTS 4,288,709 A * 9/1981 Matthias et al. ........... 310/49.23
5,818,144 A * 10/1998 Kim .............................. 310/266

(Continued)

FOREIGN PATENT DOCUMENTS

DE    100 38 339 A1    2/2002
DE    203 01 532 U1    4/2003

(Continued)

OTHER PUBLICATIONS

Machine Translation (DE202005005325) (2005).*

*Primary Examiner* — Michael Andrews
(74) *Attorney, Agent, or Firm* — Henry M. Feiereisen LLC.

(57) ABSTRACT

The aim of the invention is to provide pivoting and rotary drives for electric machines with low number of parts economically. Said aim is achieved, by means of a secondary part (4) of circular or arched design. The primary part of the drive has at least two straight primary part segments (1), arranged at a predefined angle to each other in the longitudinal direction thereof to correspond to the shape of the secondary part (4). A pivoting or rotary drive can thus be economically produced with standard linear motor components.

20 Claims, 3 Drawing Sheets

(51) Int. Cl.
  *H02K 16/00* (2006.01)
  *H02K 21/24* (2006.01)
  *H02K 1/27* (2006.01)

(56) References Cited

U.S. PATENT DOCUMENTS

| | | | |
|---|---|---|---|
| 5,975,872 A * | 11/1999 | Raines et al. | 425/136 |
| 6,255,798 B1 * | 7/2001 | Obara et al. | 318/802 |
| 6,433,451 B1 * | 8/2002 | Cherciu | 310/115 |
| 6,664,689 B2 * | 12/2003 | Rose | 310/156.32 |
| 6,856,055 B2 * | 2/2005 | Michaels et al. | 310/71 |
| 7,259,488 B2 * | 8/2007 | Naito et al. | 310/156.32 |
| 7,355,311 B2 * | 4/2008 | Shimizu | 310/156.37 |
| 2003/0038556 A1 | 2/2003 | Gieskes | |
| 2005/0179336 A1 * | 8/2005 | Hasebe et al. | 310/268 |
| 2006/0113855 A1 * | 6/2006 | Tsai et al. | 310/156.32 |
| 2006/0125342 A1 * | 6/2006 | Mossner et al. | 310/254 |
| 2006/0163964 A1 * | 7/2006 | Kojima et al. | 310/156.37 |
| 2007/0080598 A1 * | 4/2007 | Naruse | 310/156.56 |
| 2007/0262674 A1 * | 11/2007 | Shibukawa et al. | 310/268 |
| 2009/0051253 A1 * | 2/2009 | Rettner | 310/40 R |

FOREIGN PATENT DOCUMENTS

| | | | |
|---|---|---|---|
| DE | 202005005325 | * | 4/2005 |
| DE | 20 2005 005 325 U1 | | 6/2005 |
| DE | 10 2004 045 992 A1 | | 4/2006 |
| GB | 430 666 A | | 6/1935 |
| JP | 58-7829 | | 2/1983 |
| JP | 6-281867 | | 10/1994 |
| WO | WO 03/047071 A2 | | 6/2003 |
| WO | WO 2005/006517 A1 | | 1/2005 |

* cited by examiner

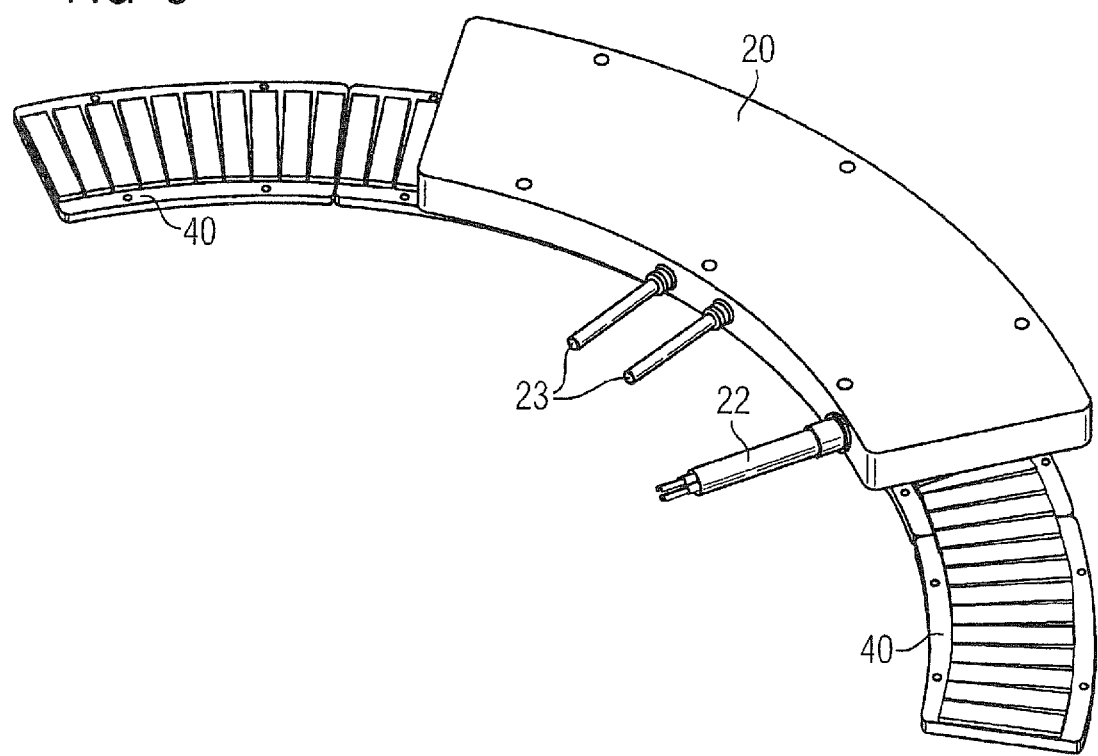

ROTARY DRIVE WITH STRAIGHT PRIMARY PART SEGMENTS

CROSS-REFERENCES TO RELATED APPLICATIONS

This application is the U.S. National Stage of International Application No. PCT/EP2008/050373, filed Jan. 15, 2008, which designated the United States and has been published as International Publication No. WO 2008/087130 and which claims the priority of German Patent Application, Serial No. 10 2007 002 782.8, filed Jan. 18, 2007, pursuant to 35 U.S.C. 119(a)-(d).

BACKGROUND OF THE INVENTION

The present invention relates to an electric drive for performing a swiveling or rotary movement with a secondary part and a corresponding primary part. In particular, the present invention relates to a press with such a drive.

In applications using direct drive technology, it is generally necessary for the motor to be matched to a high degree to the installation conditions. This means that a plurality of variant embodiments of one motor type need to be provided by the manufacturer. Furthermore, the technological and technical complexity involved in the manufacture of electric machines increases with the variety of different motor types or physical sizes of a product series of motors.

When using direct drive technology, a plurality of special embodiments of an individual motor are realized for ring-shaped and arc-shaped motor geometries with an axial and radial arrangement by virtue of the fact that the complete motor is modified. This modification ranges from the connection technology to the electromagnetically active parts. Thus, for example, the rotors and stators are manufactured from different lamination cuts for different diameters. This results in expensive technical solutions, extended delivery times and more complicated stockkeeping of spare parts for special motors.

A specific problem associated with drives results for plungers which are required for moving the male die or the female die of a deep-drawing, stamping or other press up and down. Press drives are nowadays generally equipped with hydraulic drives, in particular for high pressing forces. These drives are limited in terms of the regulation possibilities. Progressive technologies in the field of material reshaping or separation require more intervention possibilities on the drive side in the reshaping or cutting process, however, in particular also in order to increase the productivity of the plant. Problems associated with wear and therefore lack of sealtightness in the case of hydraulic drives also increase the maintenance complexity and can damage the environment or require an increased amount of complexity in terms of environment protection. Furthermore, the hydraulic oils used need to be changed after specific use times, which costs resources and money.

In general, it would therefore be desirable to use electric drives for presses since better regulation possibilities exist with such drives. In addition, problems associated with lack of sealtightness would then no longer arise and the maintenance complexity would also be reduced.

Independently of the problem of regulation described above, there is the problem with large electric machines that they generally need to be constructed especially and produced only in small numbers. This results in comparatively high costs related to production numbers, in particular also with regard to the drives used.

SUMMARY OF THE INVENTION

The object of the present invention therefore consists in proposing an electric drive for swiveling and rotary movements which can be realized easily and inexpensively also for electric machines which are produced in small numbers.

According to the invention, this object is achieved by an electric drive for performing a swiveling or rotary movement with a secondary part, which is designed to be circular or arc-shaped, and a primary part, which has at least two straight primary part segments, which are arranged at a predefined angle with respect to one another corresponding to the shape of the secondary part in relation to their longitudinal directions.

As a result of the use according to the invention of straight, short linear stators as primary part segments and rotationally symmetrical, possibly segmented rotors as basic modules of the ring-shaped or arc-shaped motor with an axial or radial arrangement, the electric motor can be matched in optimum fashion to the special installation conditions. With a straight, short stator it is possible to realize many different variants of motors (special motors) with a low degree of complexity. Thus, different diameters and segments of the motor can be manufactured relatively inexpensively. Furthermore, owing to the design of the ring-shaped motor with an axial arrangement for different diameters from the described identical basic elements, the design work, fitting and dismantling and stockkeeping of replacement parts are significantly simplified.

Preferably, the air gap between the primary part and the secondary part of the drive according to the invention runs perpendicular with respect to the rotary or swivel axis. The primary part and the secondary part in this case form two parallel planes, possibly disks, with the result that the air gap between the two parts remains constant. Alternatively, the secondary part can also run on the surface of a cylinder jacket, with the result that the air gap runs parallel to the rotary or swivel axis. In the case of straight primary part segments, however, there is then a variable air gap over the length of the primary part segments.

The secondary part can have a plurality of bent or straight secondary part segments. This makes it easy to fit. In the case of straight secondary part segments, standard secondary part segments can be used.

Furthermore, the primary part can have a plurality of primary part segments which are arranged radially one inside the other and/or axially one over the other. Thus, depending on the power requirement, corresponding cascading of primary part segments is possible. For example, it is thus possible to realize a double comb arrangement of the electric drive according to the invention. The mentioned cascading is also possible as regards the secondary part, however.

In accordance with a further embodiment, the secondary part can be designed to be circular and the primary part to be arc-shaped. This design allows for a very inexpensive variant of a rotary drive since the primary part, if the power allows it, can be reduced to a minimum.

Preferably, the secondary part is free from permanent magnets. This has the advantage that the secondary part can firstly be produced relatively favorably and secondly does not present any problems as regards safety and maintenance since it does not attract any drive-external ferromagnetic parts.

The primary part or secondary part can in addition be equipped with parallelepipedal permanent magnets. Such permanent magnets are available as standard components.

Furthermore, at least two of the primary part segments can be capable of being moved electrically with respect to one another. As a result, a plurality of movements or superimposed movements can be produced by the electric drive. The same applies if a plurality of the primary part segments can be driven differently from one another and the secondary part segments of the secondary part can be moved corresponding to one another.

Particular advantages are provided by the drives according to the invention in the case of component parts which are to be driven which have relatively large diameters and at the same time relatively low rotation speeds, as are present in the sector of large presses. In particular, as a result of a more flexible way of inputting setpoint values and a high level of control quality of the electric direct drive, process optimization during deep-drawing or stamping can take place. Furthermore, the construction-kit-type design of the motor also ensures a scalability of the drive power. The more flexible way in which the drive is designed by virtue of the variation of series, parallel or point-to-point interfaces of the primary part segments in relation to one or more converters represents a further advantage. Thus, a feed via a plurality of possibly less expensive converters is possible.

Owing to the use of straight primary part segments, which can be referred to as standard components and which can be produced in large numbers using simple production means which may be in existence, low production costs of the motor are also possible for large electric machines. The standard components used also result in simple and inexpensive fitting of the motor on the machine manufacturer's premises. In addition, they ensure simple and inexpensive replaceability of the motor components after a failure and therefore increased plant availability. Finally, stockkeeping of replacement parts without incurring high costs can also be achieved.

In contrast to hydraulic drives it should also be mentioned that the electric drive provided in principle operates without any wear. This likewise results in increased plant availability.

BRIEF DESCRIPTION OF THE DRAWING

The present invention will now be explained in more detail with reference to the attached drawings, in which:

FIG. 5 shows an arc-shaped primary part module over an arc-shaped secondary part.

DETAILED DESCRIPTION OF PREFERRED EMBODIMENTS

The exemplary embodiments described in more detail below represent preferred embodiments of the present invention.

The demands placed on the flexible matching of an electric motor to the installation conditions in direct drive technology and on technical simpler motor manufacture of a variety of ring-shaped and arc-shaped special motors with an axial and radial arrangement can be met by the use according to the invention of straight, short linear motor stators as basic elements of the stator and optionally round, arc-shaped rotationally symmetrical, possibly segmented rotors. Thus, identical stator elements can be used for different diameters. The possibility of this motor design is provided for all principles of operation of linear motors, in particular for synchronous motors with permanent magnets in the rotor or in the stator.

Figure 1:
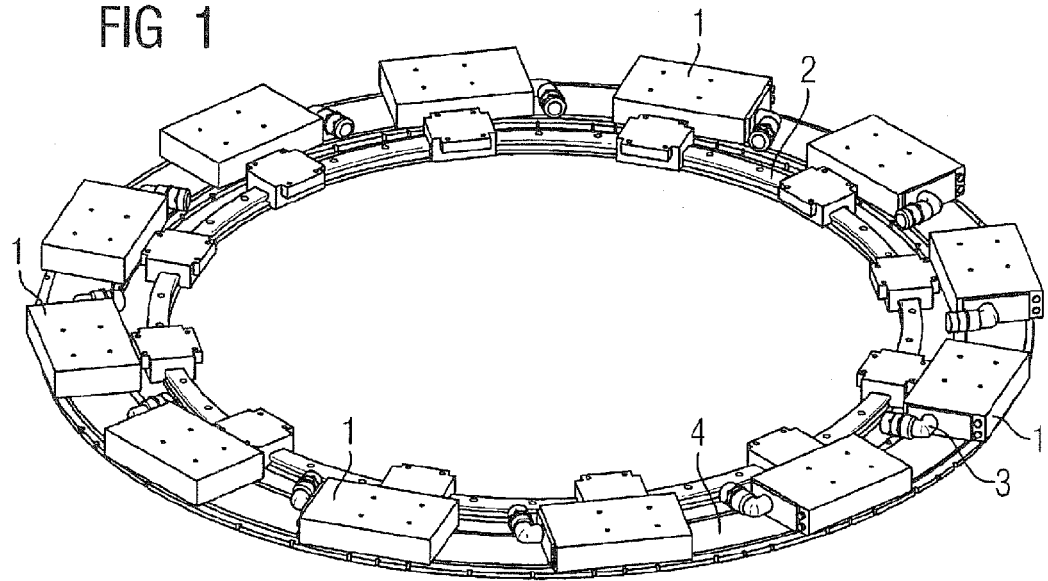
FIG. 1 shows an exemplary embodiment of a ring-shaped torque motor comprising straight stator elements and rotationally symmetrical, segmented reaction parts.

FIG. 1 reproduces an exemplary embodiment of such a rotary drive based on straight, short linear motor basic elements. The ring-shaped primary part in this case comprises 12 straight linear motor stators as primary part segments 1. They are distributed uniformly over the circumference, and therefore have a predetermined distance with respect to one another, and their longitudinal axes are in each case at an angle of 30° with respect to the next primary part segment 1. The primary part segments 1 are in this case mechanically connected to one another with the aid of a ring 2. Each of the primary part segments 1 has its own electrical connection 3, which is possibly also a cooling connection.

Beneath the ring-shaped primary part with the primary part segments 1, FIG. 1 shows a likewise ring-shaped secondary part 4. This comprises 21 segmented reaction parts. The fact that the primary part segments and the secondary part segments are split in this way results in very low cogging forces.

Figure 2:
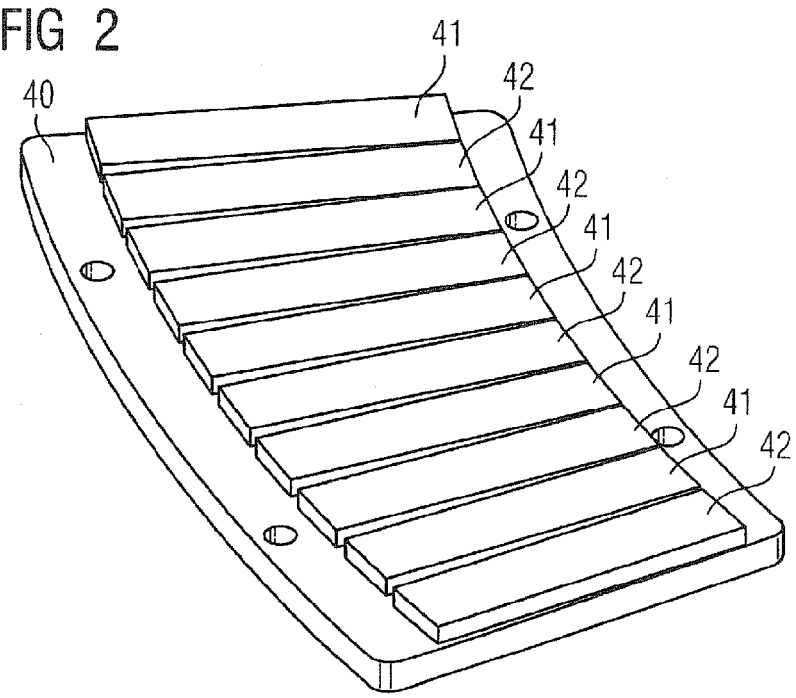
FIG. 2 shows a secondary part segment with a plurality of permanent magnets.

FIG. 2 shows a secondary part segment 40. On its surface, 10 straight permanent magnets 41, 42 with alternative polarity are arranged in the form of an arc. The circular secondary part 4 shown in FIG. 1 can be produced using 15 such secondary part segments 40.

The air gap between the primary part and the secondary part runs in one plane, which is perpendicular to the axis of rotation. A motor arrangement in which the air gap has the shape of a cylinder jacket and therefore runs parallel to the axis of rotation in the axial direction is, however, also conceivable, as has already been mentioned. In this case, the secondary part is in the form of a cylinder and the primary part segments run around the periphery of the secondary part cylinder at a certain radial distance, which corresponds to the air gap. The air gap width varies along the length of a straight primary part segment 1.

In the case of synchronous motors with permanent magnets in the rotor in accordance with the design shown in FIG. 1, wedge-shaped or else straight permanent magnets of equal size with a rotationally symmetrical arrangement can be used for different diameters. In order to avoid an undesirable magnetic field of conventional synchronous linear motor secondary parts which have been equipped with permanent magnets, a linear motor design with a secondary part without any permanent magnets can also be selected here, as is described, for example, in the document DE 10 2004 045 992 A1.

Instead of the conventional electrical machine with a stator and a rotor for rotary movements, the drive is therefore in this case also constructed from straight linear motor components. These linear motor components (primary part/primary part segments and secondary part/secondary part segments) are in this case fitted to any desired element of the component part to be driven, which element does not have a diameter which is too small. For example, a disk flywheel, which drives the press plunger via a crankshaft, can be driven directly. In this case, the secondary parts are fitted on the moveable part, and the primary part(s)/primary part segment(s) are fitted on the stationary part of the component part to be driven. The primary parts or primary part segments (active parts) of the motor are identical to those of a conventional linear motor (straight, parallelepipedal) and the secondary parts or secondary part segments (passive parts) are bent in the corresponding direction depending on the size of the motor diameter.

In order to increase the drive power and/or to neutralize the outwardly effective forces of attraction between the primary and secondary part segments, a motor with a disk-shaped air gap can be designed in the form of a so-called double comb. Furthermore, an increase in the drive torque and/or a separation of the functions "runup", "high-speed operation" or the like can also be achieved by virtue of the fact that the linear motor components are arranged on diameters which are nested one inside the other and/or axially one above the other. In this way, the linear motor components (basic elements) can be cascaded in the axial and radial direction.

The construction-kit-like (segmented) structure of the motor allows for flexible and inexpensive design. If a low torque is required and there is a large motor diameter, it is not necessary for the entire motor circumference to be equipped with primary parts. In principle, it is sufficient here for there to be one primary part on the motor circumference, which primary part in the context of the invention comprises at least two primary part segments. For motors which do not need to be completely equipped with primary parts over the circumference, the linear motor principle in accordance with the abovementioned document DE 10 2004 045 992 A1 is an option, in which the permanent magnets are arranged exclusively on the primary part.

Furthermore, the primary part segments 1 can be grouped, with the result that a joint or independent movement of the individual or grouped segments both of the rotor and of the stator is possible. This means that either a plurality of independent movements of primary parts or primary part segments or else superimposed movements thereof can be produced. Cascading of these basic elements in the axial and radial direction and joint or independent movement of these elements is likewise possible. A concentric arrangement whose outer ring rotates in one direction and whose inner ring rotates in the other direction is therefore conceivable, for example. However, the two rings can also rotate in the same direction with the same speed or with different speeds.

Figure 3:
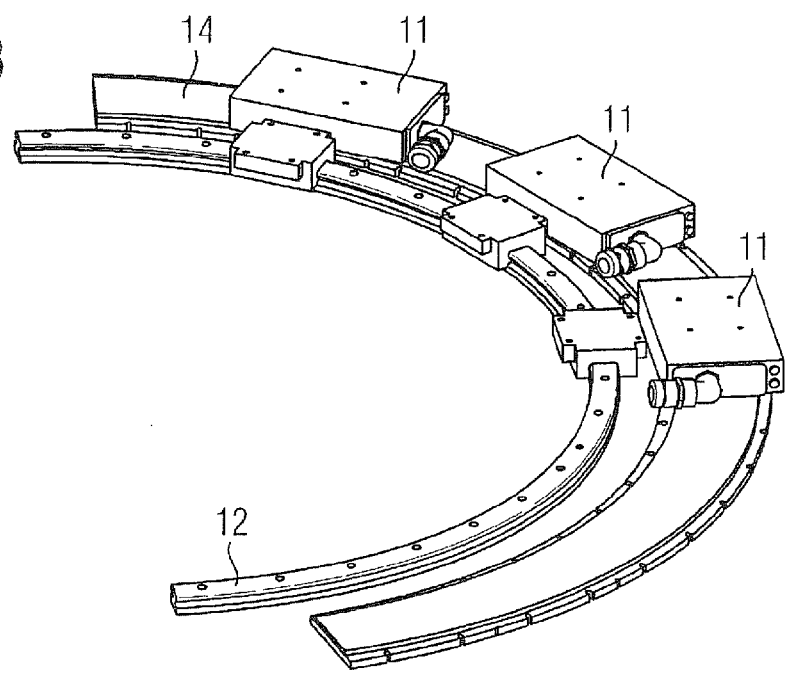
FIG. 3 shows an exemplary embodiment of a segmented, arc-shaped torque motor comprising straight stator elements and rotationally symmetrical, segmented reaction parts.

The drive concept according to the invention can also be used for swiveling movements. For this purpose, the drive can also in principle be constructed as in FIG. 1, but under certain circumstances a design as shown in FIG. 3, for example, is sufficient. In this case, the primary part comprises three primary part segments 11, which are supplied with the three winding phases of a three-phase system, for example. The primary part segments 11 are mechanically connected to one another with the aid of an arc-shaped holding element 12.

As has already been indicated above, in principle an individual short linear stator, i.e. primary part segment, can in principle also drive a circle with a relatively small diameter corresponding to the circular or arc-shaped configuration of the secondary part. However, this results in high cogging torques and high ripple owing to the stator ends and as a result of the uneven coverage of the winding phase sections. By virtue of the use of these three stators or primary part segments with a corresponding angular offset and electrical driving, this can be completely compensated for.

The secondary part 14, corresponding to the example in FIG. 3, comprises ten segmented reaction parts, which cover an arc with a defined size. This arc substantially determines the movement circumference of the drive.

The embodiment illustrated in FIG. 3 merely represents an example and it is also possible for a drive to be formed which has a transition between the arc-shaped sections and the straight sections or a transition between an axial arrangement and a radial arrangement of the air gap. Likewise, the variations listed above in connection with FIG. 1 such as cascading, secondary part without any permanent magnets etc., can also be applied to the drive in FIG. 3 for swiveling movements. This also means that the primary part segments 11 can possibly be driven differently and/or the secondary part segments can be moved independently of one another.

Figure 4:
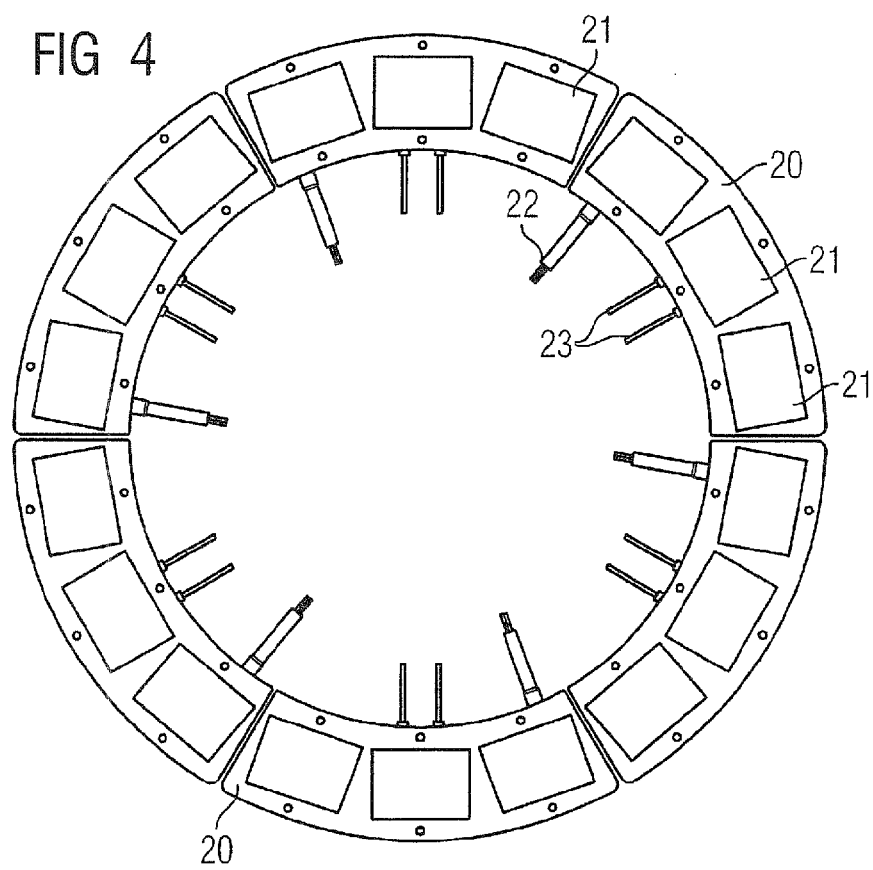
FIG. 4 shows a plan view of a primary part with a plurality of primary part modules, which each contain primary part segments.

A further advantageous embodiment of the drive according to the invention is illustrated in FIG. 4, but with there being no depiction of the secondary part. The primary part illustrated in this case comprises six arc-shaped primary part modules 20. Each of these primary part modules 20 is in the form of a ring sector. A complete ring results from in this case six primary part modules 20 being arranged next to one another in a row.

Each primary part module 20 has three primary part segments 21. Said primary part segments are connected to one another within the housing of the primary part module 20. A common electrical connection 22 and common cooling connections 23 are passed out of the primary part module 20. The user is therefore provided with the advantage that it is not necessary to individually supply each primary part segment, and the connection complexity is reduced correspondingly.

Finally, FIG. 5 shows a rotary or swivel drive, which substantially corresponds to that shown in FIG. 3. However, in this case the primary part is realized with a primary part module 20 in which for example three or a corresponding other number of primary part segments is accommodated, as is also the case in the example of FIG. 4. The perspective illustration of FIG. 5 shows the electrical connection 22 and the cooling connections 23. The secondary part in this case comprises a plurality of secondary part segments 40, as have been explained in more detail in connection with FIG. 2. The fitting of such a drive, as can be seen, is easy to implement owing to the few segments and modules.

What is claimed is:

1. An electric drive for performing a swiveling or rotary movement, comprising:
    a secondary part having a circular or arc-shaped configuration; and
    a primary part having at least one primary part module arranged on one side of the secondary part and shaped on the one side in the form of an arc, said primary part module having at least three straight primary part segments which are arranged at a predetermined angle with respect to one another corresponding to a shape of the secondary part in relation to their longitudinal directions, the straight primary parts segments are configured as straight linear stators which are linear motor components and have a straight, parallelepipedal shape, and each of the at least three primary part segments can drive in a circle with a diameter corresponding to the circular or arc-shaped configuration of the secondary part.

2. The electric drive of claim 1, wherein the primary part and the secondary part define an air gap which extends in perpendicular relationship to a rotary or swivel axis.

3. The electric drive of claim 1, wherein the secondary part has a plurality of bent or straight secondary part segments.

4. The electric drive of claim 1, wherein the secondary part is free of permanent magnets.

5. The electric drive of claim 1, wherein the secondary part is provided with parallelepipedal permanent magnets.

6. The electric drive of claim 1, wherein the primary part module further has a ring which mechanically connects the primary part segments to one another, and each of the primary part segments Of said primary part module has a connection selected from the group consisting of an electrical connection, a cooling connection, and both.

7. The electric drive of claim 1, further comprising further primary part segments, and the primary part segments are grouped in groups which can produce independent or superimposed movements.

8. The electric drive of claim 1, further comprising further primary part segments which are controllable differently from one another and secondary part segments which are movable correspondingly to one another.

9. The electric drive of claim 1, wherein the primary part module has a common electrical connection and a common cooling connection.

10. The electric drive of claim 1, wherein the three primary part segments are supplied with three winding phases of a three-phase system.

11. A press, comprising an electric drive for performing a swiveling or rotary movement, said electric drive including a secondary part having a circular arc-shaped configuration, and a primary part having at least one primary part module arranged on one side of the secondary part and shaped on the one side in the form of an arc, said primary part module having at least three straight primary part segments which are arranged at a predefined angle with respect to one another corresponding to a shape of the secondary part in relation to their longitudinal directions, the primary part segments are configured as straight linear stators which are linear motor components and have straight, parallelepipedal shape, and each of the at least three primary part segments can drive in a circle with a diameter corresponding the circular or arc-shaped configuration of the secondary part.

12. The press of claim 11, wherein the primary part and the secondary part define an air gap which extends in perpendicular relationship to a rotary or swivel axis.

13. The press of claim 11, wherein the secondary part has a plurality of bent or straight secondary part segments.

14. The press of claim 11, wherein the secondary part is constructed in the absence of permanent magnets.

15. The press of claim 11, wherein the secondary part is provided with parallelepipedal permanent magnets.

16. The press of claim 11, wherein the primary part module further has a ring which mechanically connects the primary part segments to one another, and each of the primary part segments of said primary part module has a connection selected from the group consisting of an electrical connection, a cooling connection, and both.

17. The press of claim 11, further comprising further primary part segments, and the primary part segments are grouped in groups which can produce independent or superimposed movements.

18. The press of claim 11, further comprising further primary part segments which are controllable differently from one another and secondary part segments which are movable correspondingly to one another.

19. The press of claim 11, wherein the primary part module has a common electrical connection and a cooling connection.

20. The press of claim 11, wherein the three primary part segments are supplied with three winding phases of a three-phase system.

* * * * *